April 4, 1961

J. MERCIER 2,977,763

MULTI-TORQUE CIRCUITS

Filed Dec. 31, 1957

2 Sheets-Sheet 1

INVENTOR
JEAN MERCIER
BY
Dean, Fairbank & Hirsch
ATTORNEYS

April 4, 1961

J. MERCIER 2,977,763

MULTI-TORQUE CIRCUITS

Filed Dec. 31, 1957

2 Sheets-Sheet 2

INVENTOR
JEAN MERCIER
BY
ATTORNEYS

United States Patent Office 2,977,763
Patented Apr. 4, 1961

2,977,763
MULTI-TORQUE CIRCUITS

Jean Mercier, 1185 Park Ave., New York, N.Y.

Filed Dec. 31, 1957, Ser. No. 706,492

10 Claims. (Cl. 60—51)

It is among the objects of the invention to provide relatively simple circuits which have few parts that may readily be operated and are not likely to become deranged and which will provide a plurality of working pressures with a single master source of pressure.

Another object is to provide circuits of the above type which will provide a working pressure of one value to effect initial actuation of a moving device and a working pressure of a higher value to provide a subsequent actuation of said moving device and thereupon under the force of said higher working pressure will both restore the moving device to its original position and re-establish the first working pressure to its original value.

Still another object is to provide a circuit of the above type which will provide a working pressure of one value to effect initial actuation of a moving device and a working pressure of a higher value to provide a subsequent actuation of said moving device and a working pressure of still another value to restore the moving device to its original position, said high working pressure re-establishing the last working pressure to its original value.

According to the invention, these objects are accomplished by the arrangement and combination of elements hereinafter described and particularly recited in the claims.

In the accompanying drawings in which are shown one or more of various possible embodiments of the several features of the invention, Figs. 1, 2, 3 and 4 illustrate different embodiments of the invention.

Figure 1:
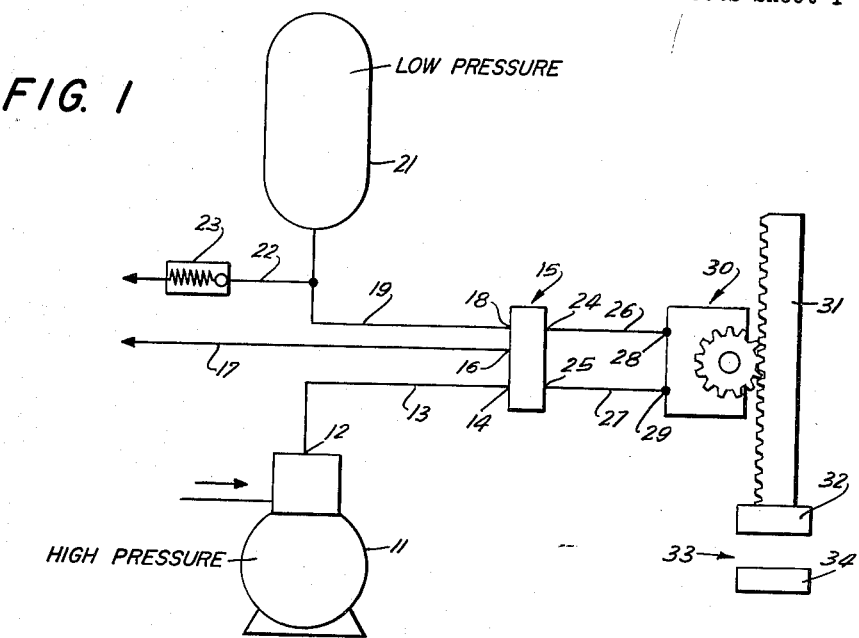

Referring now to the drawings, as shown in Fig. 1, the system comprises a high pressure compressor 11 having a capacity of say 6000 p.s.i., the output 12 of which is connected by line 13 to pressure port 14 of a selector valve 15. The valve 15 has an outlet port 16 connected by line 17 to atmosphere and an additional pressure port 18 connected by line 19 to a pressure reservoir 21 and also by line 22 to the inlet of a one-way pressure valve 23, the outlet of which is connected to atmosphere, said pressure valve 23 limiting the maximum pressure in reservoir 21 to say 2000 p.s.i.

The control ports 24, 25 of valve 15 are connected by lines 26, 27 to the ports 28, 29 of a pressure motor 30, illustratively of the rotary type, which drives a rack 31 to which is connected the plunger 32 of a press 33, said plunger being adapted to react against a fixed block 34 on which the article to be subjected to pressure is positioned.

In the operation of the press with the system above described, the valve 15 would first be actuated to connect lines 19, 26 and 27, 17 so that a differential pressure of 2000 p.s.i. would be applied to motor 30, i.e., 2000 p.s.i. from pressure reservoir 21 applied to port 28 of said motor 30. Rotation of motor 30 will drive rack 31 to move the plunger 32 to clamping position with respect to block 34. Thereupon the valve 15 would be actuated to connect lines 13, 26 and 27, 17 so that a differential pressure of 6000 p.s.i. would now be applied to motor 30, i.e., 6000 p.s.i. from compressor 11 applied to port 28 of motor 30 against atmosphere pressure applied to port 29 of said motor 30. Rotation of motor 30 under said higher pressure of 6000 p.s.i. will drive rack 31 to effect the pressing action of plunger 32 against the article on block 34. After the pressing action is completed, the valve 15 would then be actuated to connect lines 13, 27 and 26, 19. If the pressure reservoir had a charge of say 1330 p.s.i. at this time, the differential of 4670 p.s.i. applied to the motor 30 would restore the plunger 32 to open position and the fluid flowing through line 19 to pressure reservoir 21 would recharge the latter, the pressure valve 23 opening to limit the maximum pressure in reservoir 21 to 2000 p.s.i., there thus being no less than 4000 p.s.i. effective pressure available to open the press.

Figure 2:
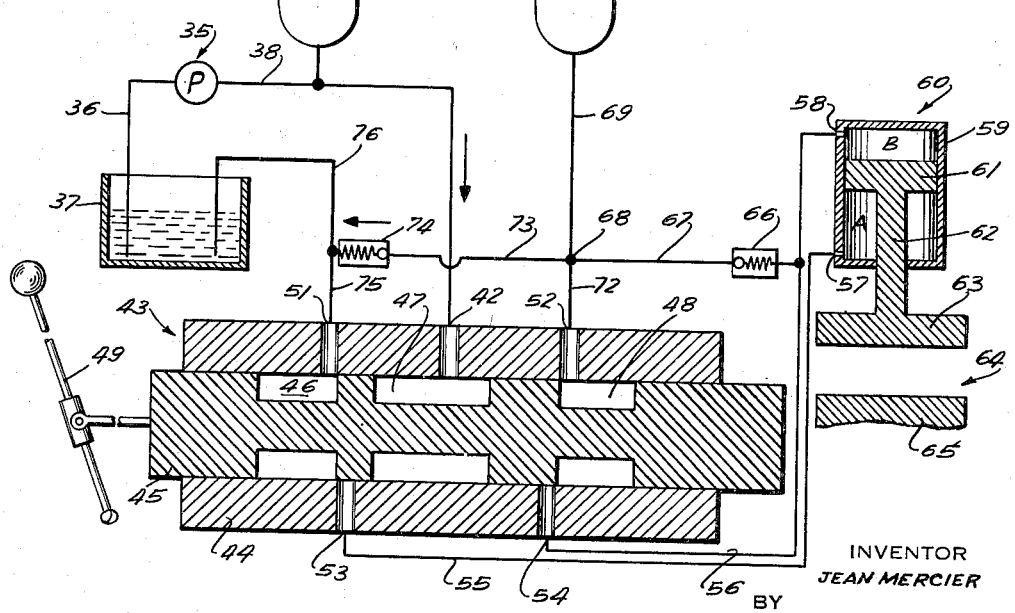

In the embodiment shown in Fig. 2, the system comprises a pump 35 driven in any suitable manner and having its inlet connected by line 36 to a reservoir 37 and its outlet connected by line 38 to a high pressure reservoir or pressure accumulator 41 and to pressure port 42 of a selector valve 43.

As shown in Fig. 2, the valve 43 comprises a casing 44 in which is slidably mounted a control rod 45 which has three spaced annular grooves 46, 47, 48 therein.

The control rod may be actuated by a lever 49 and in neutral position shown, the pressure port 42 is aligned with annular groove 47, the return port 51 is aligned with annular groove 46 and the pressure port 52 is aligned with annular groove 48.

The casing 44 has two control ports 53 and 54 which are sealed by the control rod 45 as shown, when the valve is in neutral position.

The control ports 53 and 54 are connected by lines 55 and 56 respectively, to ports 57, 58 of the cylinder 59 of a hydraulic jack 60 on each side of the piston 61 thereof. The piston 61 has a piston rod 62 which extends beyond one end of the cylinder 59 and mounts the movable plunger 63 of a press 64 which is designed to react against the fixed block 65.

The port 58 of cylinder 59 is connected through check valve 66, which permits flow therethrough only in direction toward said port 58, and line 67 to junction 68 which in turn is connected by line 69 to low pressure accumulator or pressure reservoir 71, and by line 72 to pressure port 52 and by line 73 to the inlet of pressure valve 74, the outlet of which is connected by line 75 to return port 51 of valve 43 and by line 76 to reservoir 37.

In the operation of the system shown in Fig. 2, when the selector valve 43 is in the neutral position shown, the pump 35 charges the high pressure reservoir 41 until the pressure therein attains a desired value of say 6000 p.s.i.

When the control rod 45 of valve 43 is moved to the right from the position shown in Fig. 2, the ports 51 and 53 will be connected through annular groove 46 so that a circuit is completed therethrough from the chamber A of cylinder 59 to the reservoir 37.

As a result, fluid will be free to flow from the pressure accumulator 71, which is charged to a pressure of say 2000 p.s.i. through lines 69 and 67, one-way valve 66 into chamber B of the cylinder 59 to move the piston 61 thereof and its associated piston rod 62 downwardly to move the press plunger 63 to clamped position with respect to block 65.

When the selector rod 45 is moved further to the right, the ports 51 and 53 will still remain connected through annular grooves 46 and the ports 42 and 54 will be connected through annular groove 47 so that a circuit is completed through line 56, from the high pressure reservoir 41 to chamber B of the cylinder 59, to apply a pressure of 6000 p.s.i. to effect the pressing action of the press, the one-way valve 66 restraining flow through line 67.

When the selector rod 45 is moved to the left from the pressing position above described, past the neutral position shown, ports 42 and 53 will be connected through annular groove 47 to connect the high pressure accumulator 41 through lines 38, 55 and port 57 to chamber A of cylinder 59. In addition, the ports 52 and 54 will be connected through annular groove 48 to connect the low pressure accumulator 71 through lines 69 and 56 to chamber B of the cylinder 59. As the pressure in accumulator 41 is much greater than that in accumulator 71, the piston 61 of cylinder 59 will move upwardly to open position so that fluid will flow from chamber B into accumulator 71 to recharge the latter to a value determined by the setting of pressure valve 74, illustratively 2000 p.s.i., there thus being no less than 4000 p.s.i. effective pressure to open the press.

Figure 3:
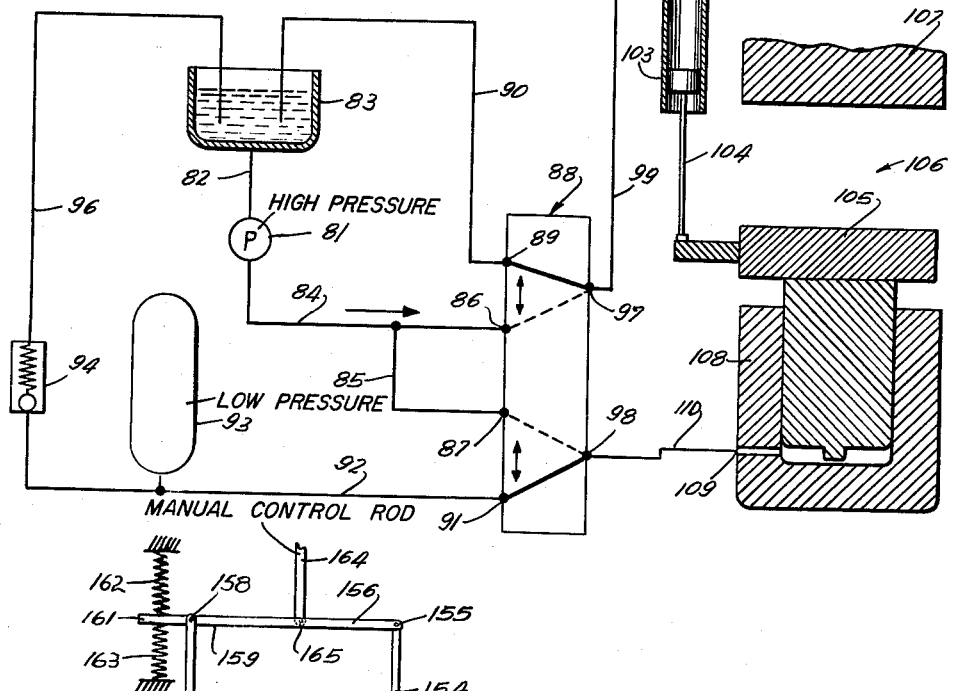

In the embodiment shown in Fig. 3, the system comprises a pump 81 having its inlet connected by line 82 to reservoir 83 and its outlet connected by lines 84 and 85 to ports 86 and 87 of valve 88. The valve has a port 89 connected by line 90 to reservoir 83 and a port 91 connected by line 92 to low pressure accumulator or pressure reservoir 93 and to the inlet of a spring loaded pressure valve 94, the outlet of which is connected by line 96 to reservoir 83.

The valve 88 has two control ports 97, 98, the former being connected by line 99 to one end of the cylinder 101 of a hydraulic jack 102. As shown in Fig. 3, the piston 103 of jack 102 has its piston rod 104 connected to the plunger 105 of a press 106 designed to move against a fixed block 107. The plunger 105 is mounted in a cylinder 108 connected through port 109 at its lower end, by line 110 to port 98 of valve 88.

In the operation of the system shown in Fig. 3, when ports 89, 97 and 91, 98 of valve 88 are connected, fluid under pressure of say 2000 p.s.i. will flow from accumulator 93 through line 92, ports 91, 98 and line 110 to port 109 of cylinder 108 to lift the plunger 105 thereof to clamped position. As the cylinder 101 is connected by line 99 and ports 97 and 89 of valve 88 and line 90 to reservoir 83, the movement of the plunger 105 is unimpeded.

Thereupon the valve 88 is moved so that the ports 89, 97 and 87, 98 of valve 88 are connected so that the plunger 105 is subjected to the high pressure flow from pump 81, i.e., say 6000 p.s.i., effective pressure to effect pressing of the press plunger against block 107.

Thereafter, ports 86, 97 and 91, 98 of valve 88 are connected so that the piston 103 of jack 102 is moved downwardly by the high pressure from pump 81 to lower the press plunger 105 and the fluid in cylinder 108 will be forced through ports 98, 91 of valve 88 and line 92 into accumulator 93 to recharge the latter, the pressure valve 94 opening when pressure in the accumulator 93 has attained a predetermined value, i.e., say 2000 p.s.i.

Figure 4:
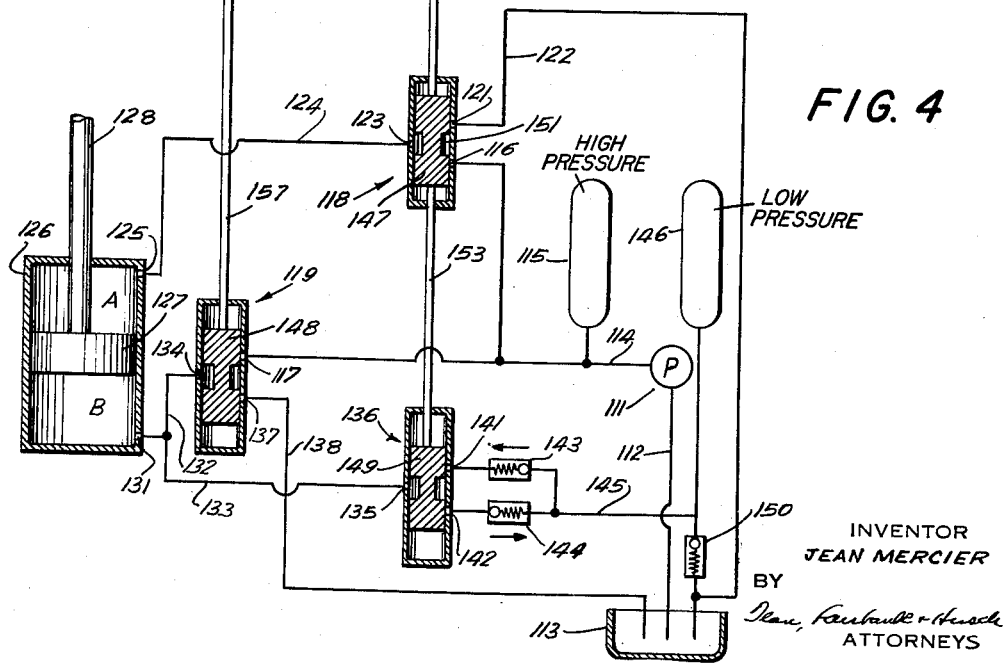

In the embodiment shown in Fig. 4 the system comprises a pump 111 driven in any suitable manner and having its inlet connected by line 112 to a reservoir 113 and its outlet connected by line 114 to a high pressure accumulator 115 and to the pressure ports 116, 117 of selector valves 118 and 119.

The valve 118 has a port 121 connected by line 122 to reservoir 113 and a port 123 connected by line 124 to the port 125 of a hydraulic cylinder 126 in which is slidably mounted a piston 127 which has a piston rod 128 connected thereto and which defines chambers A and B. The hydraulic cylinder 126 has a port 131 on the other side of the piston 127 which is connected by lines 132 and 133 to the port 134 of valve 119 and to the port 135 of valve 136.

The valve 119 has a port 137 connected by line 138 to reservoir 113 and the valve 136 has two ports 141, 142 connected respectively to one end of one-way valves 143 and 144, the other ends of said valves being connected to line 145 which in turn is connected to medium pressure accumulator 146 and to pressure relief valve 150. The valve 143 is designed to permit flow of fluid from line 145 to port 141 and the valve 144 is designed to permit flow of fluid from port 142 to line 145.

Each of the valves 118, 119 and 136 has a piston 147, 148 and 149 slidable therein, each of said pistons having an annular groove 151. The pistons 147 and 149 of valves 118 and 136 are connected by rod 153 and the piston 147 of valve 118 has an actuating rod 154 affixed thereto at one end and pivotally connected at its other end as at 155 to a lever 156. The piston 148 of valve 119 has a rod 157 connected thereto at one end, the other end of said rod being pivotally connected as at 158 to lever 156 with the end 161 of the latter being straddled by a pair of substantially identical coil springs 162, 163 reacting against the end 161. The lever is actuated by a control rod 164 pivotally connected at one end thereto as at 165.

In the operation of the system shown in Fig. 4, assuming that the accumulator 115 has been charged to a pressure of say 6000 p.s.i., and the accumulator 146 to a pressure of say 2000 p.s.i., when the control rod 164 is initially moved downward from the neutral position shown, as the end 161 of lever 156 is restrained from downward movement by spring 163, only the ports 123, 116 and 135, 142 of valves 118 and 136 will be connected. As a result, fluid will flow from the high pressure accumulator 115 through line 114, ports 116, 123 of valve 118 and line 124 to port 125 of hydraulic cylinder 126 to move the piston 127 thereof in a downward direction. The fluid in chamber B of cylinder 126 will flow through port 131, line 133, ports 135, 142 of valve 136, and through one-way valve 144 and line 145 into the accumulator 146 to charge the latter if need be, the pressure relief valve 150 limiting the pressure in said accumulator 146 to a value of 2000 p.s.i.

It is apparent that since the ports 117 and 137 of valve 119 are closed at this time, the piston 127 of cylinder 126 will be subjected to a differential pressure of 4000 p.s.i., i.e., the pressure in accumulator 115 against the pressure in accumulator 146.

With further downward movement of the control rod 164, the valves 118 and 136 will remain in the position previously described and as the end 161 of lever 156 abuts against spring 163, it will compress the latter and the rod 157 will move downward so that the piston 148 of valve 119 will be moved to connect ports 134 and 137. As a result, the port 131 of chamber B of the hydraulic cylinder 126 will be connected through line 132, ports 134 and 137 and line 138 to the reservoir.

Consequently, the pressure acting against the piston 127 will now be 6000 p.s.i., i.e., the pressure from pressure accumulator 115.

By reason of the one-way valve 144, no fluid can flow from the accumulator 146 through the ports 142, 135 of valve 136 to the reservoir.

Upon upward movement of the control rod 164 from the position previously described, the valves 118, 119 and 136 will all be returned to neutral position shown, in which no pressure will be applied to ports 125 and 131 of cylinder 126.

Upon further upward movement of the control rod 164 from the neutral position shown in Fig. 4, as the end 161 of lever 156 is restrained from upward movement by spring 162, only the ports 121, 123, and 141, 135 of valves 118 and 136 will be connected. As a result of the connection of ports 121, 123, the port 125 of the hydraulic cylinder 126 will be connected through lines 124 and 122 to the reservoir 113. The accumulator 146 will be connected through line 145, one-way valve 143, ports 141, 135, and line 133 to port 131 of hydraulic cylinder 126 to raise the piston 127 thereof. As a result, the pressure acting against piston 127 at the start of the upward movement of said piston will be 2000 p.s.i.

With further upward movement of the control rod, the valves 118, 136 will remain in the position previously described and as the end 161 of lever 156 abuts against the spring 162, it will compress the latter and the rod 157 will move upwardly so that the ports 117 and 134 of valve 119 will be connected. Consequently, fluid will flow from the high pressure accumulator 115 through line 114, ports 117, 134, line 132 to port 131 of hydraulic cylinder 126 to continue the upward movement of its piston, said piston now being subjected to a pressure of 6000 p.s.i.

Efficient utilization of power is afforded by the circuits above described which enables a single source of high pressure to furnish low pressure when needed for movement of the press plunger and high pressure, both for the clamping action and recharging purposes.

As many changes could be made in the above circuits, and many apparently widely different embodiments of this invention could be made without departing from the scope of the claims, it is intended that all matter contained in the above description or shown in the accompanying drawings, shall be interpreted as illustrative and not in a limiting sense.

Having thus described my invention, what I claim as new and desire to secure by Letters Patent of the United States is:

1. A hydraulic system for operating a fluid motor having at least two ports, said system comprising a high pressure source of fluid, a pressure reservoir to provide a lower pressure source of fluid, valve means interconnecting said fluid motor, said high pressure source and said pressure reservoir, said valve means having at least three operating positions, the first of said positions connecting said pressure reservoir to said motor to effect actuation thereof in one direction, the second of said positions connecting said high pressure source of fluid to said motor to effect further actuation thereof in the same direction, and said third position connecting one of said pressure sources of fluid to said motor to effect actuation thereof in the opposite direction, said valve means in one of said three positions connecting one of the ports of the motor to said high pressure source and the other port of said motor to said pressure reservoir to recharge the latter.

2. The combination set forth in claim 1 in which means are associated with said pressure reservoir to limit the pressure therein to a predetermined amount.

3. The combination set forth in claim 1 in which a pressure valve is connected in parallel with the pressure reservoir and adapted to limit the pressure therein to a predetermined amount.

4. The combination set forth in claim 1 in which said fluid motor comprises a pair of cylinders, each having a port at one end and a piston slidable therein, the pistons of said cylinders being operatively connected, whereby movement of one of said pistons toward its associated port will effect movement of the other of said pistons away from its associated port.

5. A system of the character described comprising a fluid motor comprising a pair of cylinders each having a port at one end and a piston slidable therein, means operatively connecting said pistons whereby movement of one of said pistons toward its associated port will effect movement of the other of said pistons away from its associated port, a high pressure source of fluid, a pressure reservoir to provide a lower pressure source of fluid, a selector valve having a first and second control port, a return port and three additional ports, means connecting two of said additional ports to the high pressure source of fluid, means connecting the third additional port to said pressure reservoir, means connecting said control ports to the ports of said cylinders, said selector valve being constructed and arranged to connect one of said control ports to either said return port or one of said two additional ports and to connect the other of said control ports to either the other of said additional ports or said third additional port.

6. The combination set forth in claim 5 in which a pressure valve is connected to said pressure reservoir to limit the pressure therein to a predetermined amount.

7. A hydraulic system for operating a fluid motor having two ports, said system having a fluid return to a free exhaust and comprising a pressure source adapted to furnish fluid under relatively high pressure, a pressure reservoir, a selector valve interconnecting said source, said pressure reservoir and said fluid motor, said selector valve having means in one position to provide a fluid circuit from said pressure reservoir to said motor and from said motor to return to a free exhaust, whereby fluid will flow from said reservoir into one of the ports of the motor and from the other port to return to a free exhaust, said valve having means in a second position to connect said source to said first named port and to connect said other port to return to a free exhaust and having means in a third position to connect said source to said second named port of said fluid motor and to connect said pressure reservoir to said first named port of said motor, said pressure reservoir having a pressure valve associated therewith to limit the pressure therein to predetermined amount.

8. The combination set forth in claim 7 in which said selector valve comprises a casing having a return port adapted to be connected to a free exhaust, a first and second pressure port and a first and second control port, and having a rod slidably mounted in said casing controlling said ports, said control ports being respectively connected to the ports of said motor, said pressure source being connected to the first pressure port and said pressure reservoir being connected to said second pressure port, a line connecting said pressure reservoir to the port of said motor to which the first control port is connected, a one-way valve in said line permitting flow in direction toward said motor port, said rod being conformed so as, in the first position of the selector valve, to connect said second control port to said return port, and in the second position of said selector valve to connect said first pressure port and said first control port and to connect said second control port to said return port, and in the third position of said selector valve to connect said first pressure port and said second control port and to connect said second pressure port and said first control port.

9. A hydraulic system for operating a fluid motor having two ports, said system having a fluid return and comprising a pressure source adapted to furnish fluid under relatively high pressure, a pressure reservoir, a selector valve interconnecting said source, said pressure reservoir and said fluid motor, said selector valve having means in one position to connect said pressure reservoir to one of the ports of said motor and to connect the other port of said motor to return, said valve having means in a second position to connect said source to said first named port and to connect said other port to return and having means in a third position to connect said source to said second named port of said fluid motor and to connect said pressure reservoir to said first named port of said motor, said pressure reservoir having a pressure valve associated therewith to limit the pressure therein to a predetermined amount.

10. A hydraulic system for operating a fluid motor, said system comprising a high pressure source of fluid, a pressure reservoir to provide a lower pressure source of fluid, valve means interconnecting said fluid motor, said high pressure source and said pressure reservoir, said valve means having at least three operating positions, the first of said positions connecting said pressure source to one side of said motor and said pressure reservoir to the other side of said motor to actuate said motor and recharge said pressure reservoir, the second of said positions connecting said pressure source to said one side of the motor and the other side to return, and the third of said positions connecting said pressure reservoir to the other side of the motor and the first side of the motor to return, means being associated with said pressure reservoir to limit the pressure therein to a predetermined amount.

References Cited in the file of this patent
UNITED STATES PATENTS

| | | |
|---|---|---|
| 1,290,203 | Houk | Jan. 7, 1919 |
| 2,182,059 | Schwartz | Dec. 5, 1939 |
| 2,392,471 | Fox | Jan. 8, 1946 |
| 2,802,336 | Ball | Aug. 13, 1957 |